United States Patent

Sawachi et al.

[11] Patent Number: 5,512,947
[45] Date of Patent: Apr. 30, 1996

[54] VIDEO CAMERA

[75] Inventors: Youichi Sawachi; Masanori Yoshida, both of Asaka, Japan

[73] Assignee: Fuji Photo Film Co., Ltd., Kanagawa, Japan

[21] Appl. No.: 220,169

[22] Filed: Mar. 30, 1994

[30] Foreign Application Priority Data

Mar. 31, 1993 [JP] Japan .................. 5-074261

[51] Int. Cl.[6] .................................. H04N 5/232
[52] U.S. Cl. .................... 348/243; 348/229; 348/362
[58] Field of Search .............................. 348/257, 258, 348/243, 241, 251, 227, 229, 362, 363, 678, 691, 693, 695, 696, 697; H04N 512.32

[56] References Cited

U.S. PATENT DOCUMENTS

| | | | |
|---|---|---|---|
| 4,412,246 | 10/1983 | Allen et al. | 348/257 |
| 4,473,839 | 9/1984 | Noda | 348/257 |
| 4,723,169 | 2/1988 | Kaji | 348/257 |
| 4,723,170 | 2/1988 | Jaspers | 348/243 |
| 4,786,969 | 11/1988 | Shougi et al. | 348/693 |
| 4,816,917 | 3/1989 | Yamamoto et al. | 348/257 |
| 4,821,087 | 4/1989 | Honjo | 348/693 |
| 5,075,778 | 12/1991 | Saito | 348/363 |
| 5,086,343 | 2/1992 | Cook et al. | 348/257 |
| 5,105,276 | 4/1992 | Schrock | 348/691 |
| 5,111,311 | 3/1992 | Yamamoto | 348/251 |

*Primary Examiner*—Wendy R. Greening
*Assistant Examiner*—Bipin Shalwala

[57] ABSTRACT

In a video camera, black level correction is turned off in a backlight correction condition or when an AGC gain is high, video signals are converted to digital signals by an A/D converter, the digital video signals are compared with a reference value by a data comparator, and a number of times that the comparison is less than the reference value is counted by an integrator. The reference value, where the counted number of times is the predetermined number of times or more, is determined by a microcomputer, a black level correction value according to the determined reference value is set, and clamp circuits are provided with the black level correction value to correct the black level, thereby preventing a bad influence due to black level correction during exposure correction or when the AGC gain is high, and making black level correction by digital processing.

30 Claims, 5 Drawing Sheets

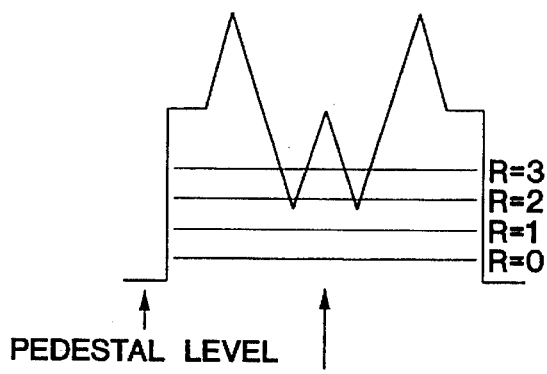

FIG. 6(a)

PEDESTAL LEVEL

CASE 1
WHEN REFERENCE VALUE INITIAL SETTING R=0,
R=0 → R=1 → R=2 ; 3 TIMES
WHEN REFERENCE VALUE INITIAL SETTING R=2,
R=0 → R=1 ; 2 TIMES

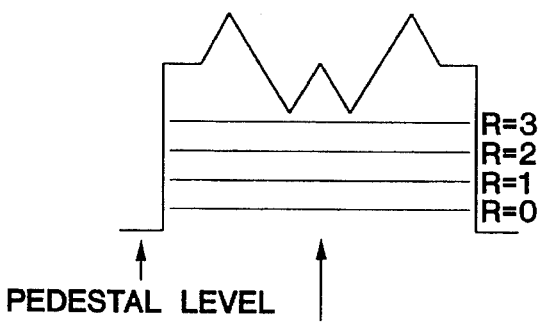

FIG. 6(b)

PEDESTAL LEVEL

CASE 2
WHEN REFERENCE VALUE INITIAL SETTING R=0,
R=0 → R=1 → R=2 → R=3 ; 4 TIMES
WHEN REFERENCE VALUE INITIAL SETTING R=3,
R=3 ; 1 TIME

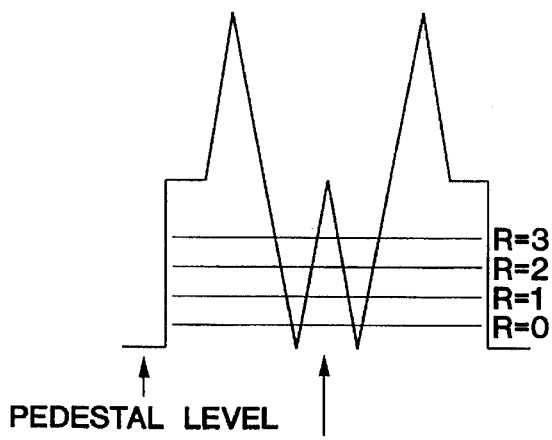

FIG. 6(c)

PEDESTAL LEVEL

CASE 3
WHEN REFERENCE VALUE INITIAL SETTING R=0,
R=0 ; 1 TIME
WHEN REFERENCE VALUE INITIAL SETTING R=0,
R=0 ; 1 TIME

VIDEO CAMERA

FIELD OF THE INVENTION

This invention relates to a video camera, and more specifically to a technology for preventing adverse effects due to black level correction when an automatic gain control circuit (AGC) has a high gain, and a black level correction technology by digital processing.

BACKGROUND OF THE INVENTION

Conventional video cameras have involved a problem in that, when flare is generated due to diffused reflection in the optical system and on the camera face, the black level of video signal tends to increase, reducing the image contrast.

Recently, to prevent this problem, a flare compensation circuit and a black level correction (DBS) circuit have been proposed, in which the black level is decreased during a time of low contrast due to flare generation to improve the contrast.

However, these flare compensation and DBS circuits have been defective in that, if the black level correction is always effected, the black level is decreased also at an exposure correction such as backlight correction, which results in an insufficient exposure correction effect. Further, if the black level is decreased when the AGC gain is high, an S/N ratio of dark portions tends to be considerably degraded.

On the other hand, a conventional black level correction circuit detects an average value of video signals, and varies the black level in proportion to the average value. Therefore, the black level correction tends to be excessive or insufficient, which results in an insufficient improvement of the contrast.

A primary object of the present invention is to provide a video camera which solves the above described problems in conventional video cameras.

SUMMARY OF THE INVENTION

The objects of the present invention are fulfilled by providing a video camera comprising black level correction means for correcting a black level of video signals, determination means for determining a backlight correction condition, and stopping means for discontinuing the correction by the black level correction means when the backlight correction condition is determined.

There is also provided according to another embodiment of the present invention a video camera comprising black level correction means for correcting a black level of video signals, determination means for determining whether or not a control value of automatic gain control means is a predetermined value or more, and stopping means for discontinuing the correction by the black level correction means when the control value is the predetermined value or more.

There is further provided according to an embodiment of the present invention a video camera comprising A/D conversion means for converting analog video signals obtained from a camera device to digital video signals, lamp means for clamping a black level of the digital video signals at a black level correction value, sampling means for sampling the digital video signals, comparison means for comparing the sampled digital video signals with a reference value at predetermined intervals, determination means for determining whether a number of times where the sampled digital video signals are lower than the reference value is more or less than a predetermined number of times, reference value updating means for increasing the reference value of the comparison means by a predetermined value to be a next update reference value when the number of times is determined to be less than the predetermined number of times, and black level correction value setting means for setting the black level correction value according to the reference value when the number of times is determined to be not less than the predetermined number of times and providing the clamp means with the black level correction value.

This video camera may further comprise updating continue determination means for determining whether or not updating of the reference value continues for a predetermined number of updating times, and when the number of times where the sampled digital video signals are lower than the reference value is less than said predetermined number of times after continuation of the predetermined updating number of times, the black level correction value setting means sets no black level correction value.

The video camera may further comprise updating continue determination means for determining whether or not updating of the reference value continues for a predetermined number of updating times, and when updating continues for the predetermined number of updating times, the black level correction value setting means provides the clamp means with the black level correction value according to the latest reference value.

There is further provided according to another embodiment of the present invention a video camera comprising A/D conversion means for converting analog video signals obtained from a camera device to digital video signals, clamp means for clamping a black level of the digital video signals at a black level correction value, sampling means for sampling the digital video signals, comparison means for comparing the sampled digital video signals with a reference value at predetermined intervals, determination means for determining whether the number of times where the sampled digital video signals are lower than the reference value is more or less than a predetermined number of times, reference value updating means for decreasing the reference value of the comparison means by a predetermined value to be a next updating reference value when the number of times is determined to be not less than the predetermined number of times, and black level correction value setting means for setting the black level correction value according to the reference value when the number of times is determined to be less than the redetermined number of times and providing the clamp means with the black level correction value.

The video camera may further comprise updating continue determination means for determining whether or not updating of the reference value continues for a predetermined number of updating times, and when the number of times where the sampled digital video signals are lower than the reference value is net less than the predetermined number of times after continuation of the predetermined number of updating times, the black level correction value setting means sets no black level correction The video camera may further comprise a plurality of the comparison means, wherein each of the individual comparison means is provided with a different reference value for parallel comparison processing.

The video camera may further comprise determination means for determining a backlight correction condition, wherein the black level correction value setting means outputs no black level correction value when the backlight correction condition is determined.

The video camera may further comprise determination means for determining whether or not a control value of automatic gain control means is a predetermined value or more, wherein the black level correction value setting means outputs no black level correction value when the control value is determined to be the predetermined value or more.

The video camera operates so that when the black level correction value setting means once sets the black level correction value and then begins the next black level correction processing, the reference value updating means uses the last reference value of the previous black level correction processing as an initial value.

In the video camera, black level correction may be turned off in a backlight correction condition and, in such a exposure correction, the black level is not decreased, thereby providing a sufficient exposure correction effect. Furthermore, when the AGC gain is high, black level correction may be turned off to prevent the S/N ratio of dark portions of the video signals from decreasing.

The video camera may be able to make black level correction by digital processing, in which the reference value is updated from a small value at the pedestal side to greater value, ad the number of times where the sampled digital video signals are smaller than the reference value is counted at a predetermined interval such as 1V or 1H. When the number of times is a predetermined number of times or more, it is considered that a dark level of video signals is detected, with a black level correction value according to the reference value at that time being set and the video signals being clamped at the reference value, thereby correcting the black level of video signals. In this case, since it is meaningless that the reference value is continuously updated to an excessively great value, black level correction is not made when the sampled digital video signals are not less than the reference value for more than the predetermined number of times after updating of the reference value is continued for a predetermined number of updating times. Also, the video signals may be clamped at a black level correction value according to the reference value at that time.

The video camera may also correct the black level by digital processing. In this case, on the contrary, the reference value is updated from a greater value at the pedestal side to a smaller value, and the number of times where the sampled digital video signals are smaller than the reference value is counted at a predetermined interval such as 1V or 1H. When the number of times is less than a predetermined number of times, it is considered that a dark level of video signals is detected, with a black level correction value according to the reference value at that time being set and the video signals being clamped at the reference value, thereby correcting the black level of video signals. In this case, since it is meaningless that the reference is continuously updated to an excessively small value, black level correction is not made when the sampled digital video signals are less than the reference value for more than the predetermined number of times after updating of the reference value is continued for a predetermined number of updating times.

In the video camera, black level correction may be made in a short time by making parallel comparison processing. Further, in the backlight correction condition or when the AGC gain is high, black level correction is not made but is turned off, thereby providing a sufficient exposure correction effect and preventing a decrease in S/N ratio of dark portions of video signals. When black level correction is once made and then the next black level correction processing is begun, the black level correction is begun with the previous last reference value to achieve black level correction in a short time.

Further scope of applicability of the present invention will become apparent from the detailed description given hereinafter. However, it should be understood that the detailed description and specific examples, while indicating preferred embodiments of the invention, are given by way of illustration only, since various changes and modification within the spirit and scope of the invention will become apparent to those skilled in the art from this detailed description.

BRIEF DESCRIPTION OF THE DRAWINGS

The present invention will become more fully understood from the detailed description given hereinbelow and accompanying drawings which are given by way of illustration only and thus are not limitative of the present invention and wherein:

FIGS. 6(a), 6(b) and 5(c) is a schematic view showing a black level correction example.

DESCRIPTION OF PREFERRED EMBODIMENTS

Figure 1:
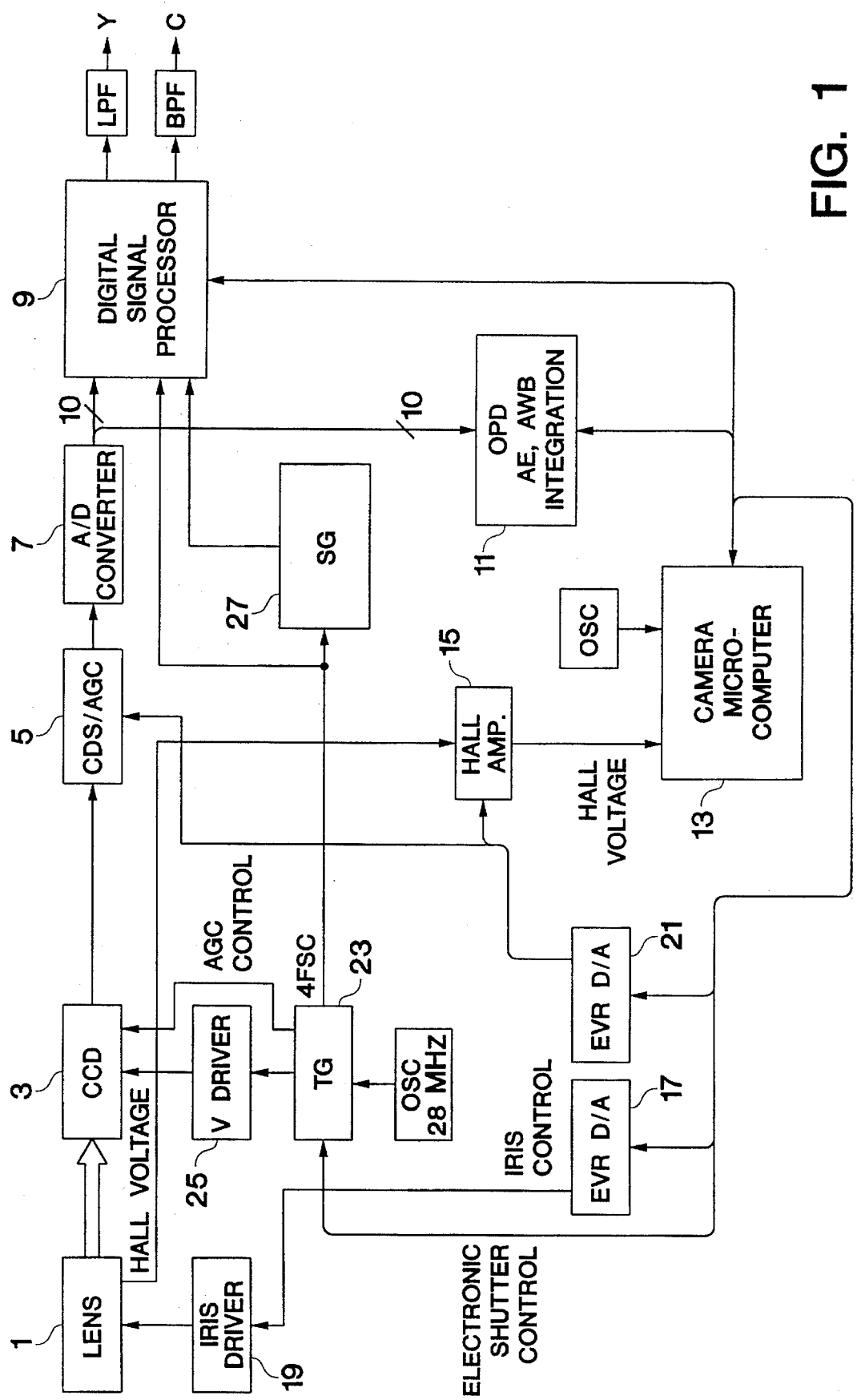
FIG. 1 is a circuit diagram showing a camera system of the first embodiment of video camera according to the present invention.

The preferred embodiments of the present, invention will be described with reference to the drawings. FIG.1 is a circuit diagram showing the camera system of a video camera for one embodiment to which the present invention is applied. As shown in FIG. 1, an optical image formed by a lens 1 is focused on a light, receiving surface of a CCD 3, an analog camera signal is outputted from the CCD 3, which is sample and hold processed and gain controlled by a CDS/AGC circuit 5, converted to a digital signal by an A/D converter 7 and inputted to a digital signal processing circuit unit 9, and to an AE (automatic exposure) and AWB (automatic white balance) digital integration circuit unit 11. In FIG. 1, the numeral 13 indicates a microcomputer of a camera unit, which inputs a Hall voltage representing an iris aperture through a Hall device amplifier 15 to detect the iris aperture, obtains a light measurement value from the AE and AWB digital integration circuit unit 11 and, for exposure control, provides an iris driver 19 with an iris control signal through a D/A converter 17 to control the iris aperture.

Furthermore, the microcomputer 13 also provides the CDS/AGC circuit 5 with an AGC control value through a D/A converter 21 to control the AGC gain. Also, the microcomputer 13 provides a timing circuit 23 with an electronic shutter control value to control an electronic shutter of tile CCD 3 by a driver 25. The microcomputer 13 further obtains a color temperature detection value from the AE and AWB digital integration circuit unit 11, and provides the signal processing circuit unit 9 with an AWB control value. The numeral 27 indicates a timing circuit.

Figure 2:
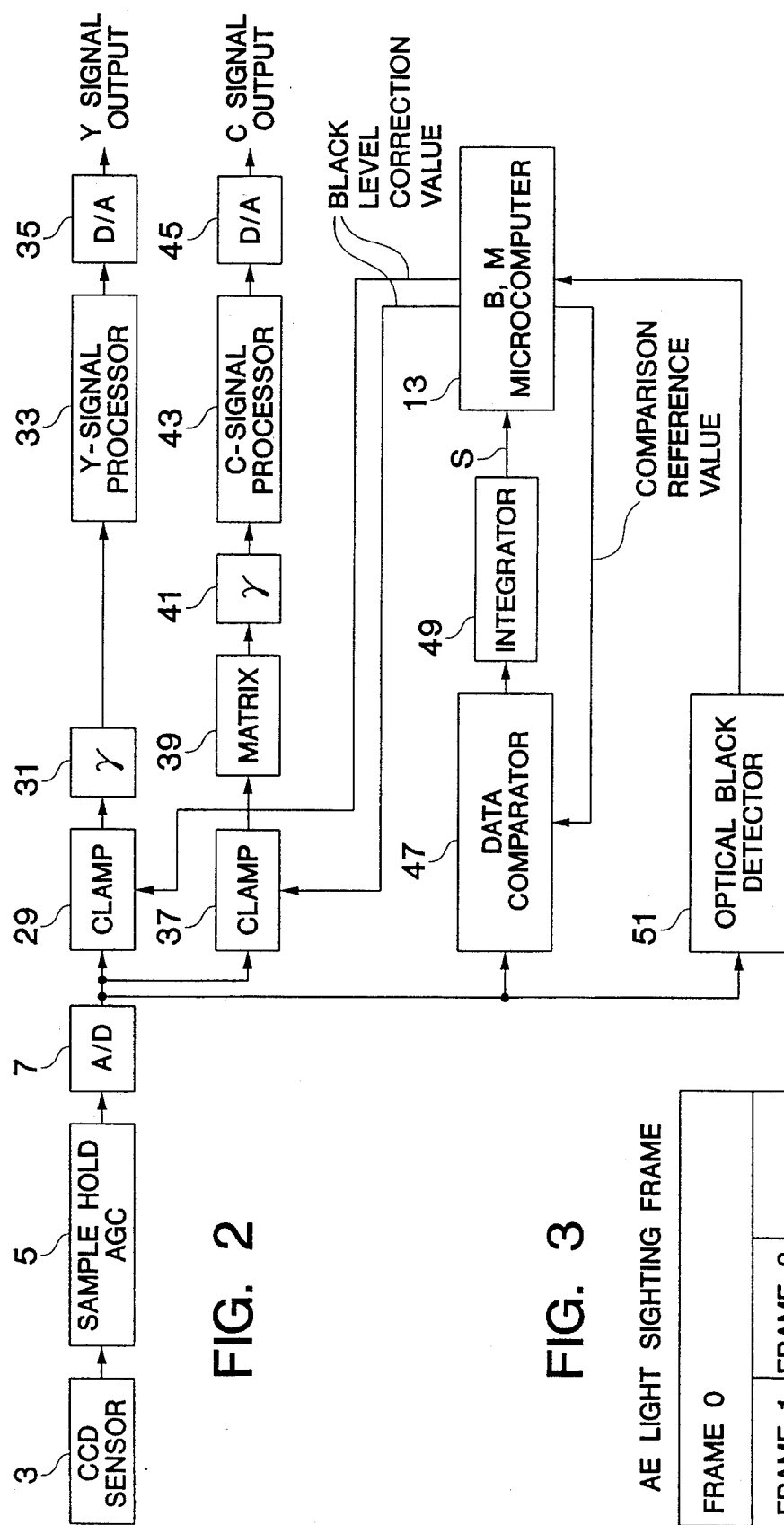
FIG. 2 is a circuit diagram showing the structure of a digital signal processing circuit unit and a digital integration circuit unit according to another embodiment of the present invention.

As shown in FIG. 2, for a brightness signal, the digital signal processing circuit unit 9 is provided with a clamp circuit 29, a γ correction circuit 31, a signal processing circuit 33, and a D/A converter 35, and an analog brightness signal Y is outputted through these circuits. Further, for the color signal, the digital signal processing circuit unit 9 has a clamp circuit 37, matrix circuit 39, a γ correction circuit 41, a color signal processing circuit 43, and a D/A converter 45, and an analog color signal C is outputted through these circuits.

As shown in FIG. 2, the AE and AWB digital integration circuit unit 11 is provided with a data comparator 47, an integrator (counter) 49, and an optical black detector 51.

The microcomputer 13 determines whether or not the AGC control value is a predetermined value or more and, when the AGC control value is the predetermined value or more, sets the black level correction value to the clamp circuits 29 and 37 to zero, and turns off black level correction.

Further, the microcomputer 13 determines whether or not a backlight correction condition exists based on information from the AE and AWB integration circuit unit 11 and, when the backlight correction condition exists, sets the black level correction value to the clamp circuits 29 and 37 to zero, and turns off black level correction.

Figure 4:
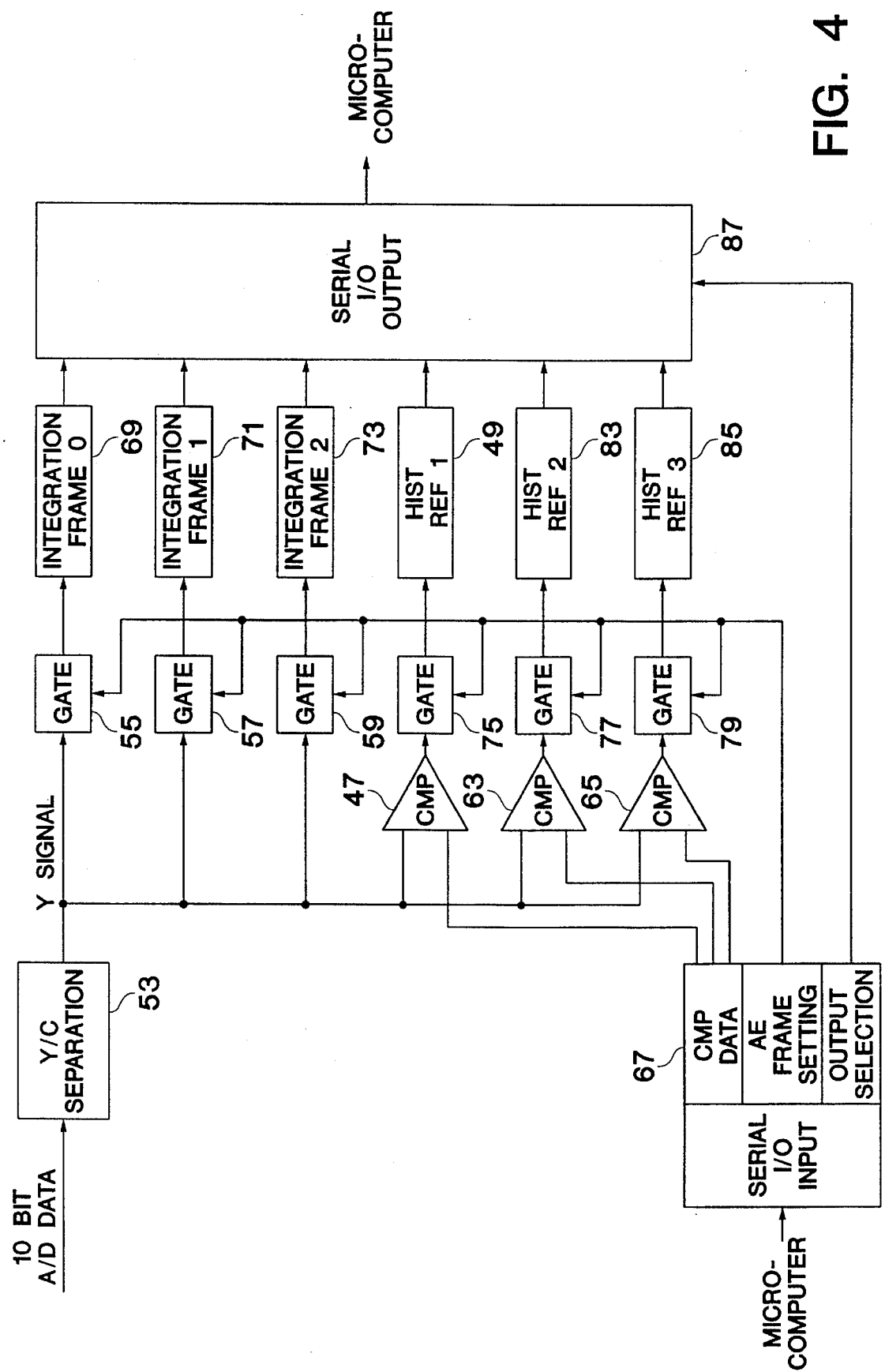
FIG. 4 is a circuit diagram showing the structure of AE processing system of a digital integration circuit unit according to another embodiment of the present invention.

An AE signal output system of the AE and AWB digital integration circuit unit 11 has a construction as shown in FIG. 4, in which a digital brightness signal obtained by a Y/C separation circuit 53 is inputted to three gate circuits 55, 57, and 59, and to three data comparators 47, 63, and 65.

Figure 3:
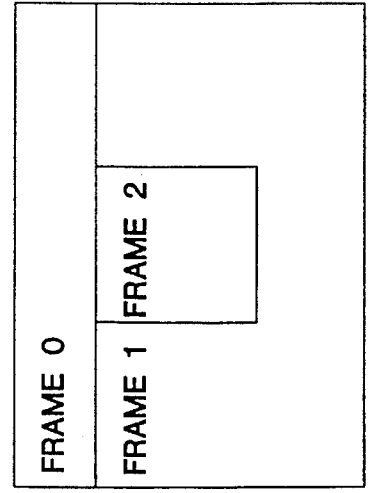
FIG. 3 is a schematic view showing an example of a light sighting frame.

The three gate circuits 55, 57, and 59 open according to AE frame setting information given from the microcomputer 13 through an interface 67, and provide light sighting frame integrators 69, 71, and 73 such as for frame 0, for frame 1, and for frame 2 with the individual outputs. Outputs of the individual integrators 69, 71 and 73 are applied to the microcomputer 13 through an interface 87. The light sighting frame is set, for example, as shown in FIG. 3 to obtain a total picture average light measurement value PMave and a weighted light measurement value PMwet. When weighted as frame 2>frame 1>frame 0, a backlight condition is determined when PMwet<PMave, backlight correction is applied according to the difference between PMave and PMwet, and black level correction is turned off when the backlight correction value increases to a predetermined value.

The data comparator 47 is applied with a reference value for comparison through the interface 67. The data comparator 47 determines whether or not every digital brightness signal is less than the reference value, and outputs a pulse when the signal is less than the reference value, the pulse being counted by the counter (integrator) 49 through a gate 75 at every predetermined time such as 1V, 1H, or the like to obtain a number S of times of less than the reference value. The reference value is given from the microcomputer 13 through the interface 67, and updated. In FIG. 4, the numerals 77 and 79 indicate gate circuits, and 83 and 85 indicate counters.

Figure 5:
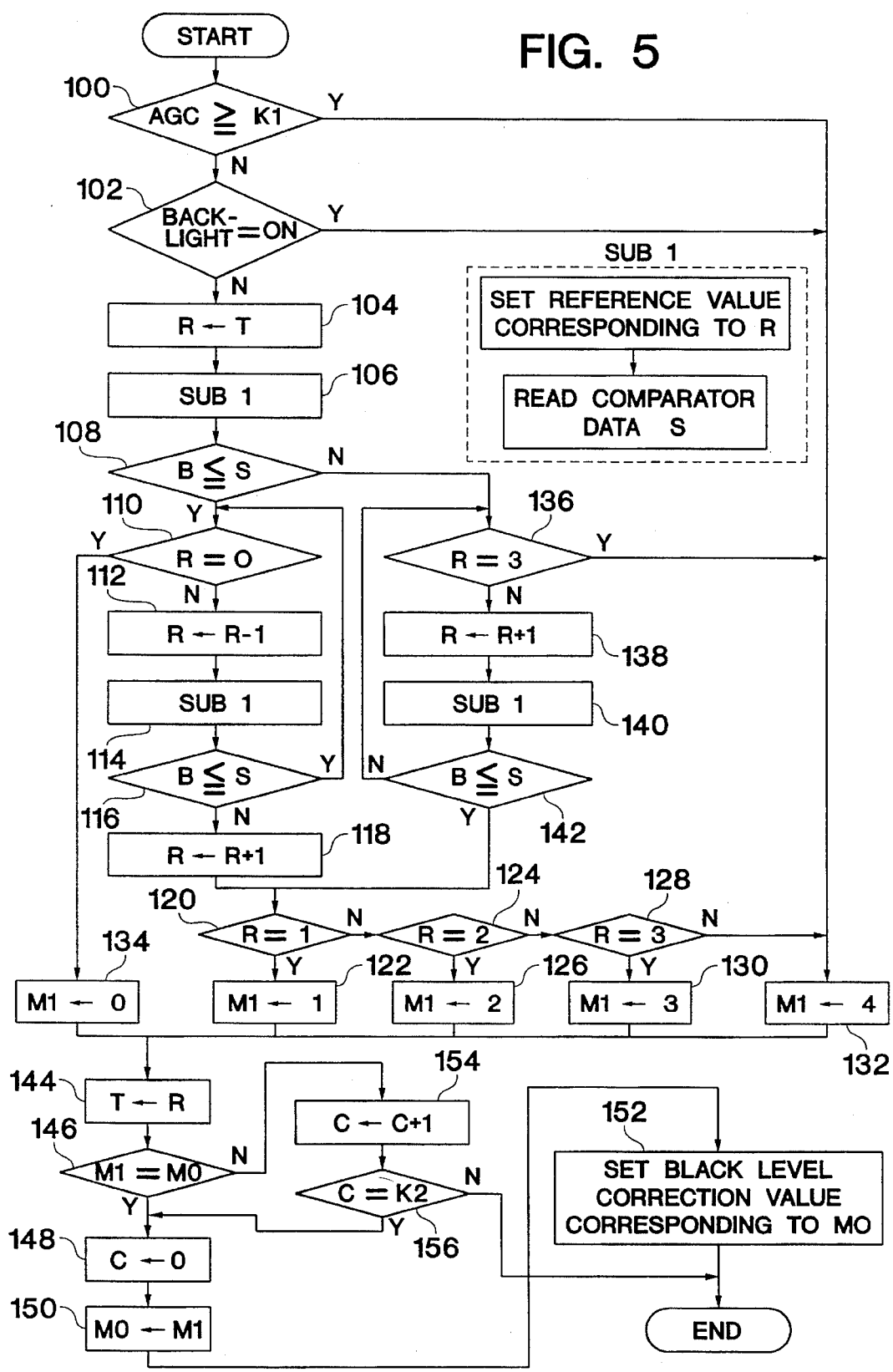
FIG. 5 is a schematic view showing an example of a black level correction flow chart for an embodiment of the present invention.

The microcomputer 13 carries out black level correction using the number of times, that is, the integration value S, obtained from the integrator (counter) 49. The operation will be described with reference to FIGS. 5, 6(a), 6(b) and 6(c). FIG. 5 shows the flow chart of black level correction for one embodiment of the present invention. In FIGS. 5, 6(a), 6(b) and 6(c), K1, K2, and B are fixed setting values, R, S, M0, M1, C, and T are variables, and M0=1, M0=2, M0=3, and M0=4 are black level correction values. These values are defined as follows:

K1: AGC control value to turn off black level correction (predetermined value);

K2: Condition count number to update M0 (predetermined number of updating times);

B: Setting value for black level detection (predetermined number of times);

R: Reference value of data comparator 47;

S: Integration value of integrator 49 (counted number of times);

M0: Black level correction value being executed;

M1: Black level correction value obtained from detection result;

C: Number of counts of continuous M0≠M1 (number of updating times);

T: Initial setting value of reference value R;

M0=4: Black level correction value is zero; and

M0=0<M0=1<M0=2<M0=3.

referring to FIG. 5, when the AGC gain is less than a predetermined value K1 and there is not a backlight correction condition (steps 100 and 102), a reference value R according to the initial value T is set, and the integration or count value S is read as shown in SUB1 (steps 104 and 106). When the integration value S is less than the predetermined number of times B and R≠0, R is decreased to R−1 and the reference value corresponding to R−1 is set as shown in SUB1 (steps 108, 110, 112, and 114), further when the integration value S at this time of the R−1 is also less than the predetermined number of times B, R is set to R +1 (steps 116 and 118) and, as a result, if R=1, M1=1 is set (steps 120 and 122). If R≠1 and R=2, M1=2 is set (steps 124 and 126). Further, if R≠1 and R≠2, and if R=3, M1=3 is set, or if R≠1, R≠2 and R≠3, M1 =4 is set (steps 128, 130, and 132). When R=0 in step 110, M1=0 is set (step 134), and when B≦S in step 116, the processing returns to step 110.

When B>S in step 108, if R≠3, R is increased to R +1 and the reference value corresponding to R+1 is set as shown in SUB1 (steps 136, 138, and 140). When the integration value S at this time of R+1 is the predetermined number of times B or more in step 142, a determination is made in step 120 as to whether or not R=1 or, on the contrary, when B>S, the processing returns to step 136 (step 142).

When M1 is set in steps 122, 126, 130, 132, and 134, R at that time is set as the initial value T (step 144), and a determination is made as to whether or not M1=M0 (step 146). When M1=M0, the count value C is set to zero, M0 is unchanged because of no updating, a black level correction value corresponding to M0 is set, and the value is applied to the clamp circuit (steps 146, 148, 150 and 152). When M1 ≠M0 in step 146, because of updating, the count value C is increased to C+1, and a determination is made as to whether or not the valise C is K2 (steps 154 and 156). When the value C is K2, the processing proceeds to step 148, and when the value C is not K2, the processing is ended (steps 154 and 156).

Examples of the above processing result are shown in FIGS. 6(a), 6(b) and 6(c). In FIG. 6(a), when the reference value initial setting is R=0, because of updating of the reference value, black level is detected at the third time of R=0→R=1→R=2, or when the initial setting is R =2 of the previous result, black level can be detected at the second time of R=2→R=1. In FIG. 6(b), when the initial setting is R=0, because of updating of the reference value, black level can be detected at the fourth time of R=0→R=1→R=2→R=3, or when the initial setting is R=3 of the previous result, black level can be detected at one time in FIG. 6(c), without updating, black level can be immediately detected when the initial setting is R=0.

The initial value T may be either 0 or 3. Further, when updating of the reference value continues for a predetermined number of times, it is preferable to set the black level correction value to zero and turn off the black level correction, or make a correction with a black level correction value according to the latest reference value. Further, parallel processing can be made to detect black level in a short time by additionally using the data comparator 63, the gate circuit 77 and the counter 83 shown in FIG. 4, and providing the two data comparators 47 and 63 with different reference values.

With the present invention, a bad influence of black level correction can be prevented during exposure correction or when the AGC gain is high, and reliable black level correction by digital processing is achieved.

The invention being thus described it will be obvious that the same may be varied in many ways. Such variations are not, to be regarded as a departure from the spirit and scope of the invention, and all such modifications as would be obvious to one skilled in the art are intended to be included within the scope of the following claims.

What is claimed is:

1. A video camera comprising:

A/D conversion means for converting analog video signals obtained from a camera device to digital video signals;

clamp means for clamping a black level of the digital video signals at a black level correction value;

sampling means for sampling a brightness of the digital video signals to obtain brightness samples;

comparison means for comparing the brightness samples with a reference value at predetermined intervals;

a counter for counting a number of times S that the brightness samples are lower, during the predetermined intervals, than the reference value;

determination means for determining whether the number of times S is more or less than a predetermined number of times B;

reference value updating means for increasing the reference value of said comparison means by a predetermined value to be a next updated reference value when S is determined to be less than of B, S<B; and black level correction value setting means for setting said black level correction value according to the reference value when S is determined to be not less than B, S≧B, and providing said clamp means with said black level correction value.

2. The video camera of claim 1 further comprising:

updating continue determination means for determining whether updating of the reference value continues for a predetermined number of updating times, and for preventing, when S is less than B after continuation of the predetermined number of updating times, said black level correction value setting means from setting said black level correction value.

3. The video camera of claim 1 further comprising updating continue determination means for determining whether updating of the reference value continues for a predetermined number of updating times, and when updating continues for the predetermined number of updating times, said black level correction value setting means provides said clamp means with said black level correction value according to the latest reference value.

4. A video camera comprising:

A/D conversion means for converting analog video signals obtained from a camera device to digital video signals;

clamp means for clamping a black level of the digital video signals at a black level correction value;

sampling means for sampling a brightness of the digital video signals to obtain brightness samples;

comparison means for comparing the brightness samples with a reference value at predetermined intervals;

a counter for counting a number of times S that the brightness samples are lower, during the predetermined intervals, than the reference value;

determination means for determining whether the number of times S is more or less than a predetermined number of times B;

reference value updating means for decreasing the reference value of said comparison means by a predetermined value to be a next updated reference value when S is determined to be not less than B, S≧B; and black level correction value setting means for setting said black level correction value according to the reference value when S is determined to be less than B, S<B, and providing said clamp means with said black level correction value.

5. The video camera of claim 4 further comprising:

updating continue determination means for determining whether updating of the reference value continues for a predetermined number of updating times, and for preventing, when S is not less than B after continuation of the predetermined number of updating times, said black level correction value setting means from setting said black level correction value.

6. The video camera of claim 1 further comprising a plurality of said comparison means, wherein each of said individual comparison means is provided with a different reference value for parallel comparison processing.

7. The video camera of claim 4 further comprising a plurality of said comparison means, wherein each of said individual comparison means is provided with a different reference value for parallel comparison processing.

8. The video camera of claim 1 further comprising backlight correction determining means for determining a backlight correction condition, wherein said black level correction value setting means is prevented from outputting said black level correction value when said backlight correction condition is determined.

9. The video camera of claim 4 further comprising backlight correction determining means for determining a backlight correction condition, wherein said black level correction value setting means is prevented from outputting said black level correction value when said backlight correction condition is determined.

10. The video camera of claim 1 further comprising gain control determining means for determining whether a control value of automatic gain control means is a predetermined value or more, wherein said black level correction value setting means is prevented from outputting said black level correction value when said control value is determined to be the predetermined value or more.

11. The video camera of claim 4 further comprising gain control determining means for determining whether a control value of automatic gain control means is a predetermined value or more, wherein said black level correction value setting means is prevented from outputting said black level correction value when said control value is determined to be the predetermined value or more.

12. The video camera of claim 1 wherein when said black level correction value setting means first sets said black level correction value and then begins a subsequent black level correction processing, said reference value updating means uses said reference value before said next updated reference value is generated of a previous black level correction processing as an initial value.

13. The video camera of claim 4 wherein when said black level correction value setting means first sets said black level correction value and then begins a subsequent black level correction processing, said reference value updating means uses said reference value before said next updated reference value is generated of a previous black level correction processing as an initial value.

14. A device for processing video signals comprising:
   black level correction means for correcting a black level of video signals;
   determination means for determining whether a backlight correction condition exists; and
   stopping means for discontinuing correction of said black level for said video signals by said black level correction means when said backlight correction condition is determined to exist by said determination means.

15. A device for processing video signals comprising:
   black level correction means for correcting a black level of video signals;
   determination means for determining whether a control value of automatic gain control means is a predetermined value or more; and
   stopping means for discontinuing correction of said black level for said video signals by said black level correction means when said control value is determined to be said predetermined value or more by said determination means.

16. A method for processing video signals comprising the steps of:
   (a) correcting a black level of the video signals;
   (b) determining whether a backlight correction condition exists; and
   (c) discontinuing correction of said black level for said video signals by said step (a) when said backlight correction condition is determined to exist at said step (b).

17. A method for processing video signals comprising the steps of:
   (a) correcting a black level of the video signals;
   (b) determining whether a control value of automatic gain control means is a predetermined value or more; and
   (c) discontinuing correction of said black level for the video signals by said step (a) when said control value is determined to be said predetermined value or more at said step (b).

18. A method for processing video signals comprising the steps of:
   (a) receiving analog video signals;
   (b) converting said analog video signals received at said step (a) to digital video signals;
   (c) clamping a black level of said digital video signals at a black level correction value;
   (d) sampling a brightness of said digital video signals to obtain brightness samples;
   (e) comparing said brightness samples sampled at said step (d) with a reference value at predetermined intervals;
   (f1) counting a number of times S that the brightness samples are lower, during the predetermined intervals, than the reference value;
   (f2) determining whether the number of times S is more or less than predetermined number of times B;
   (g) increasing said reference value by a predetermined value to be an updated reference value when S is determined to be less than B, S<B, at said step (f2); and
   (h) setting said black level correction value according to said reference value S is determined to be not less than B, S≧B, and providing said step (c) with said black level correction value.

19. The method of claim 18 further comprising the step of:
   determining whether updating of said reference value continues for a predetermined number of updating times, and for preventing, when S is less than B after continuation of said predetermined number of updating times, said black level correction value from being set at said step (h).

20. The method of claim 18 further comprising the step of determining whether updating of said reference value continues for a predetermined number of updating times, and when updating continues for said predetermined number of updating times, said black level correction value is provided by said step (h) according to said updated reference value from said step (c).

21. A method for processing video signals comprising the steps of:
   (a) receiving analog video signals;
   (b) converting said analog video signals received at said step (a) to digital video signals;
   (c) clamping a black level of said digital video signals at a black level correction value;
   (d) sampling a brightness of said digital video signals to obtain brightness samples:
   (e) comparing said brightness samples sampled at said step (d) with a reference value at predetermined intervals;
   (f1) counting a number of times S that the brightness samples are lower, during the predetermined intervals, than the reference value;
   (f2) determining whether the number of times S is more or less than a predetermined number of times B;
   (g) decreasing said reference value by a predetermined value when S is determined to be not less than B, S≧B, at said step (f2); and
   (h) setting said black level correction value according to said reference value when S is determined to be less than B, S<B, and providing said step (c) with said black level correction value.

22. The method of claim 21 further comprising the step of:
   determining whether updating of said reference value continues for a predetermined number of updating times, and when S is not less than B, S≧B, after continuation of said predetermined number of updating times, said black level correction value from being set at said step (h).

23. The method of claim 18 further comprising the step of determining a backlight correction condition, wherein said black level correction value is prevented from being output at said step (h) when said backlight correction condition is determined.

24. The method of claim 21 further comprising the step of determining a backlight correction condition, wherein said black level correction value is prevented from being output at said step (h) when said backlight correction condition is determined.

25. The method of claim 18 further comprising the step of determining whether a control value of automatic gain control means is a predetermined value or more, wherein said black level correction value is prevented from being output at said step (h) when said control value is determined to be said predetermined value or more.

26. The method of claim 21 further comprising the step of determining whether a control value of automatic gain control means is a predetermined value or more, wherein said black level correction value is prevented from being output at said step (h) when said control value is determined to be said predetermined value or more.

27. The method of claim 18, wherein said step (g) uses said reference value before said updated reference value is generated of a previous black level correction processing as an initial value when said black level correction value is first set at said step (h) and a subsequent black level correction processing then begins.

28. The method of claim 21, wherein said step (g) uses said reference value before said updated reference value is generated of a previous black level correction processing as an initial value when said black level correction value is first set at said step (h) and a subsequent black level correction processing then begins.

29. A device for processing video signals comprising:

black level correction means for correcting a black level of video signals;

first determination means for determining whether a backlight correction condition exists;

first stopping means for discontinuing correction of said black level for said video signals by said black level correction means when said backlight correction condition is determined to exist by said determination means;

second determination means for determining whether a control value of automatic gain control means is a predetermined value or more; and second stopping means for discontinuing correction of said black level for said video signals by said black level correction means when said control value is determined to be said predetermined value or more by said determination means.

30. A method for processing video signals comprising the steps of:

(a) correcting a black level of the video signals;

(b) determining whether a backlight correction condition exists;

(c) discontinuing correction of said black level for said video signals by said step (a) when said backlight correction condition is determined to exist at said step (b);

(d) determining whether a control value of automatic gain control means is a predetermined value or more; and (e) discontinuing correction of said black level for the video signals by said step (a) when said control value is determined to be said predetermined value or more at said step (d).

* * * * *